(12) United States Patent
Albers

(10) Patent No.: US 11,596,985 B2
(45) Date of Patent: Mar. 7, 2023

(54) FACILITY FOR TREATING OR PROCESSING OR TRANSPORTING PRODUCTS

(71) Applicant: MINDA Industrieanlagen GmbH, Minden (DE)

(72) Inventor: Thomas Albers, Minden (DE)

(73) Assignee: MINDA Industrieanlagen GmbH, Minden (DE)

( * ) Notice: Subject to any disclaimer, the term of this patent is extended or adjusted under 35 U.S.C. 154(b) by 85 days.

(21) Appl. No.: 17/209,668

(22) Filed: Mar. 23, 2021

(65) Prior Publication Data

US 2021/0299711 A1   Sep. 30, 2021

(30) Foreign Application Priority Data

Mar. 27, 2020   (DE) .................... 10 2020 108 570.2

(51) Int. Cl.
   *B08B 5/02*   (2006.01)
   *G01V 8/10*   (2006.01)

(52) U.S. Cl.
   CPC . *B08B 5/02* (2013.01); *G01V 8/10* (2013.01)

(58) Field of Classification Search
   CPC .................................. B08B 5/02; G01V 8/10
   See application file for complete search history.

(56) References Cited

U.S. PATENT DOCUMENTS

| | | | | |
|---|---|---|---|---|
| 5,649,338 A | * | 7/1997 | Kato .................... | B65G 45/005 15/312.1 |
| 2014/0320634 A1 | * | 10/2014 | Lyyra .................... | G03B 19/16 348/88 |
| 2018/0299667 A1 | * | 10/2018 | Lyyra .................... | G03B 17/55 |
| 2019/0031155 A1 | | 1/2019 | Mizuno et al. | |
| 2019/0275991 A1 | | 9/2019 | Schmidt et al. | |

FOREIGN PATENT DOCUMENTS

| | | |
|---|---|---|
| DE | 102018117709 | 1/2019 |
| WO | 2015122793 | 8/2015 |

OTHER PUBLICATIONS

European Search Report for EP Application No. 21164939.7-1017 dated Sep. 13, 2021, 2 pages.

* cited by examiner

*Primary Examiner* — Erin F Bergner
(74) *Attorney, Agent, or Firm* — Andrew M. Calderon; Calderon Safran & Cole, P.C.

(57) ABSTRACT

A facility for treating or processing or transporting products, using materials made Of wood composite, paperboard or plastic, the facility includes at least: a machine and at least one sensor assigned to the machine which has a detection surface oriented essentially in a vertical direction V, and is subject to a contamination of the detection surface during the treatment or processing process. The at least one sensor is assigned its own blow-off device operating with compressed air which includes at least of: a compressed air generator, an overpressure container, a blow-off nozzle and an electrically controllable switching valve. The compressed air generator is connected to the overpressure container via a first line and the overpressure container is connected to the blow-off nozzle via a second line.

16 Claims, 3 Drawing Sheets

FACILITY FOR TREATING OR PROCESSING OR TRANSPORTING PRODUCTS

FIELD OF INVENTION

The invention relates to a facility for the treatment or processing or transport of products using materials made of wood composite, paperboard or plastic, said facility comprising at least a machine and one sensor assigned to the machine, said sensor having a detection surface oriented essentially in a vertical direction which is subject to contamination during the treatment or processing process.

BACKGROUND

The monitoring of production facilities is usually also conducted by means of sensors which, for example, monitor the orientation of the products or the production progress in a processing chain. These sensors can work optically or inductively, for example. In particular, if they are aligned in a vertical direction (detection direction) and are part of a light barrier, for example, the detection surface lying in a horizontal plane is subject to contamination in the production process. In particular, if there is an increased amount of dust during treatment, processing or transport, as is the case in the wood or paper processing industry, the detection surfaces of the sensors must be cleaned regularly. This is costly and has to be done manually by an operator using suitable tools. If the degree of contamination of the detection surface is too high, the sensor fails, which may cause the production facility to stop. Since it is not immediately apparent to the machine operator why the standstill has occurred, maintenance personnel must be requested to search for and rectify the cause of the fault. Considerable downtimes cannot be ruled out, which increases production costs.

It therefore makes sense to provide regular and, if possible, automatic cleaning of the sensors. It is conceivable to blow off the dust using compressed air. The installation of a corresponding piping system and the provision of compressed air is usually not accepted by the operators of the facility because additional maintenance work is necessary and facilities are often operated hydraulically or electrically and not pneumatically. In addition, there is a risk of contamination of the sensor surface when using standard compressed air due to oil components in the compressed air.

From DE 10 2018 117 709 A1 it is known, for example, to spray the rear view camera of a vehicle with air or cleaning fluid and to provide a cleaning system with a pump, an air chamber and a nozzle for this purpose.

On this basis, the facility described above is to be improved in such a way that regular and automatic cleaning of the sensors with at least a detection surface oriented in a vertical direction can be carried out.

SUMMARY

To solve the problem, a facility according to the preamble is characterised in that the at least one sensor is assigned its own blow-off device operating with compressed air, which consists at least of a compressed air generator, an overpressure container, a blow-off nozzle and a switching valve, the compressed air generator being connected to the overpressure container via a first line and the overpressure container being connected to the blow-off nozzle via a second line.

This design creates a self-sufficient system consisting of a sensor and the cleaning system. This allows the blow-off device to be located in the immediate vicinity of the sensor and to be a separate unit. The compressed air generator can be a small piston pump or a mini-compressor, by means of which only a small amount of compressed air is fed into the overpressure container per work cycle.

The switching valve can be electrically controlled. The switching valve is preferably a 3/2-way valve or a 3/3-way valve. It can preferably be driven in a time-controlled or pressure-controlled manner. In time-controlled operation, the valve is opened at regular intervals and the compressed air stored in the overpressure container is directed to the blow-off nozzle, by means of which the detection surface is then blown. In pressure-controlled operation, the switching valve switches when a preset pressure is reached in the overpressure container. In principle, time and pressure control can also be used together. The pressure control ensures that the compressed air generator generates the pressure until the target pressure is generated, the time control ensures that cleaning is carried out at fixed intervals (e.g. once a day). Another way of controlling the switching valve can be by an external signal, which is initiated, for example, by the sensor to be cleaned through self-diagnosis.

Preferably, the compressed air generator is operated permanently. Permanent operation has the advantage that the compressed air generator can be selected to be as small as possible in order to take up as little installation space as possible, although care must of course be taken to ensure that the overpressure container is also filled appropriately within a reasonably selected period of time in order to ensure the functionality of the blow-off device. In this embodiment, the switching valve can be designed to be purely mechanical and selected in such a way that it opens at a certain pressure and the blow-off device becomes effective. It then closes again and the pressure builds up again. Of course, interval operation is also possible.

The fact that the blow-off device is a separate unit that can be assigned to each sensor renders possible a very simple set-up of the facility. If a blow-off device fails, it can easily be replaced. Small piston pumps or mini-compressors are inexpensive to procure. The compressed air container does not require a large volume to ensure sufficient performance of the blow-off device. Short blasts of compressed air are quite sufficient to blow off dust lying on the detection surface. The blow-off device can be used in a very flexible manner and can generally be used for all branches of industry in which sensors are used to monitor facilities.

BRIEF DESCRIPTION OF DRAWINGS

In the following, an example of an embodiment of the invention will be explained with the aid of a figure.

It shows.

DETAILED DESCRIPTION OF DISCLOSURE

Figure 1:
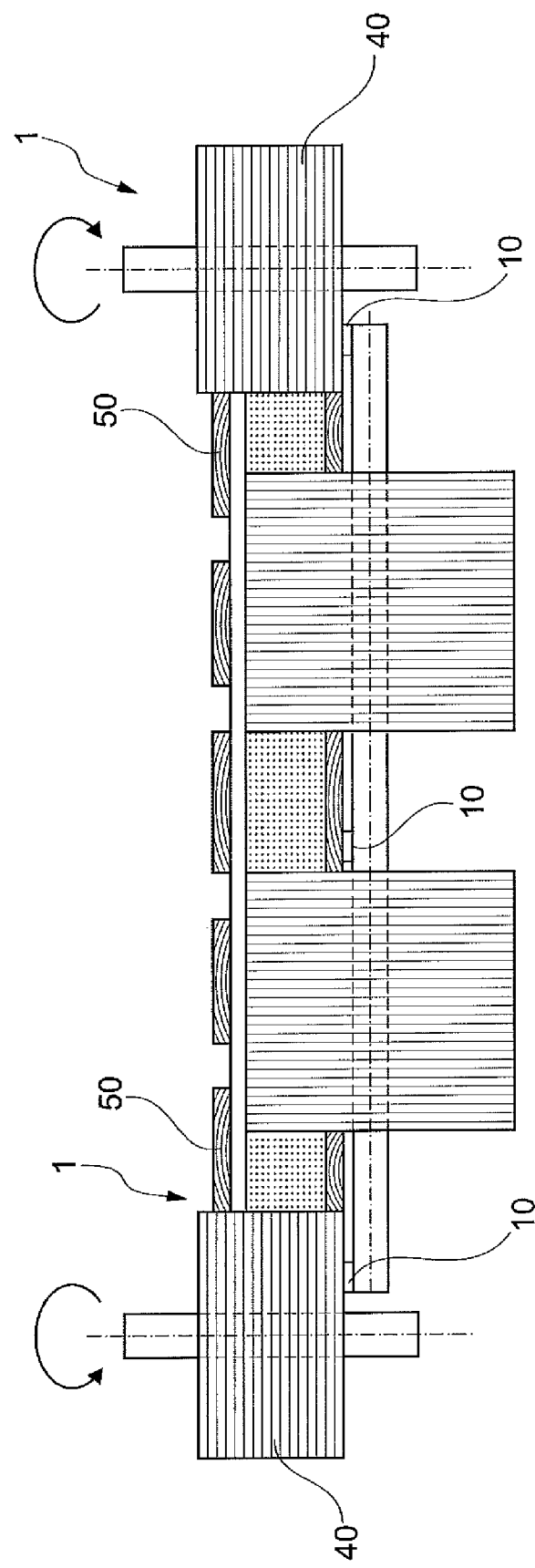
FIG. 1 shows a schematic representation of a facility for cleaning a transport or storage pallet.
Figure 2:
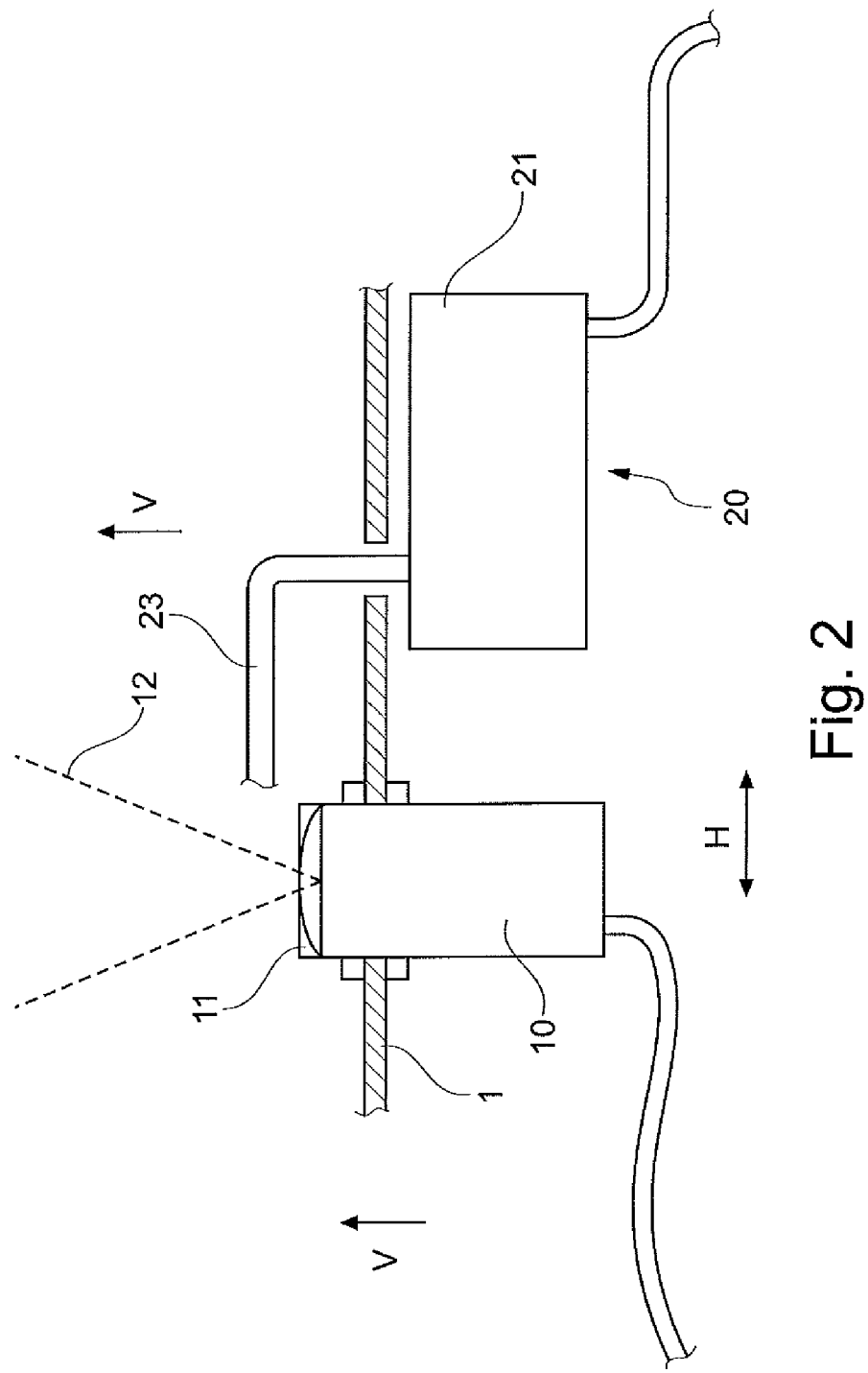
FIG. 2 shows a schematic representation of the overall structure of the blow-off device and the sensor.
Figure 3:
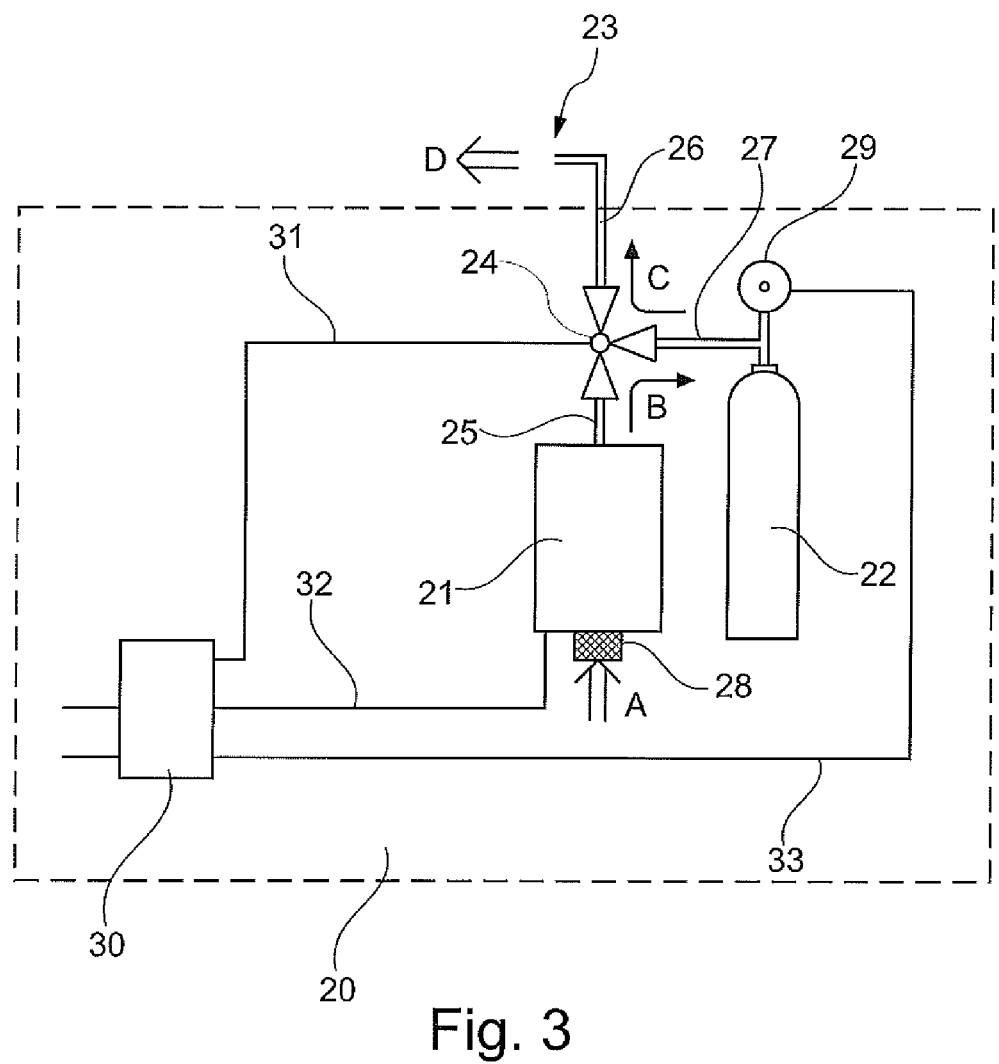
FIG. 3 shows a detailed schematic representation of the blow-off device.

The facility for treating, processing or transporting products according to the invention will be explained below on the basis of a facility for cleaning a transport or storage pallet. In principle, however, the invention can be used in all facilities or machines that are monitored by means of sensors 10 or light barriers. In the facility, several machines 1 are provided one behind the other in a transport direction in order to clean individual pallets 50 via rotating brushes 40.

A plurality of sensors 10 are provided on the machines 1. The sensors 10 have a detection surface 11 oriented essentially in a vertical direction V. The sensor 10 transmits light and ultrasonic waves 12 in a vertical direction via the detection surface 11, and the detection surface 11 extends essentially in a horizontal plane H, whereby dusts can easily settle and form a continuously growing layer. The blow-off device 20 is arranged in the immediate vicinity of the sensor 10, wherein said blow-off device consists of a compressed air generator 21, an overpressure container 22, a blow-off nozzle 23 and an electrically controllable 3/2-way valve 24. Of course, the switching valve 24 can also be a 3/3-way valve. The compressed air generator 21 can be a small piston pump or a mini compressor. The compressed air generator 21 is connected to the overpressure container 22 via a first line 25. The compressed air container 22 is connected to the blow-off valve 23 via a second line 26. The lines 25, 26 are connected to the switching valve 24. The compressed air container 22 is connected to the switching valve 24 via a third line 27. Depending on the switching position of the switching valve 24, compressed air is pumped from the compressed air generator 21 into the overpressure container 22 or compressed air is fed from the overpressure container 22 and the lines 26, 27 to the blow-off nozzle 23, via which the detection surface 11 is blown on in order to free it from dust. An air filter 28 is assigned to the compressed air generator 21 via which the intake air is cleaned. The overpressure container 22 features a pressure gauge 29 which visualises the overpressure in the compressed air container 22. The blow-off nozzle 23 is oriented in such a way that the detection surface 11 of the sensor 10 is completely swept by a blast of compressed air.

The switching valve 24 is electrically controlled and connected to a control unit 30. This control unit 30 controls the switching valve 24 via the control line 31 and the compressed air generator 21 via a control line 32. The pressure gauge 29 is also connected to the control unit 30 via a signal line 33. When a preset pressure is reached in the overpressure container 22, a switching signal is given by the control unit 30 to the switching valve 24 to open it so that compressed air from the compressed air container 22 reaches the nozzle 23.

It is also possible to operate the switching valve 24 in a time-controlled manner and to open it at regular time intervals so that compressed air is released from the compressed air container 22. The blow-off device 20 is a separate component situated in its own housing (not shown here) and can be installed in any position, but as close as possible to the sensor 10 within the system. Each sensor 10 is assigned its own blow-off device 20. The intake air is shown by arrow A, the pressure build-up from the compressed air generator 21 into the overpressure container 22 is indicated by directional arrow B, the compressed air decompression is represented by directional arrow C and the sensor cleaning is indicated by directional arrow D.

If a 3/3-way valve is used for the switching valve 24, the pressure build-up in the compressed air container 22 takes place in the first valve position; in the second valve position the pressure in the compressed air container 22 is maintained because the target pressure is reached and the compressed air generator 21 is switched off; and in the third valve position the compressed air container 22 is emptied for cleaning the sensor 10.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A facility for treating or processing or transporting products comprising materials of wood composite, paperboard or plastic, the facility comprising:
   at least a machine; and
   multiple sensors assigned to the machine oriented essentially in a vertical direction V and which each comprises a detection surface on that contamination settles on the detection surface during the treatment or processing process,
   each sensor being assigned its own blow-off device operating with compressed air and being a separate unit that is located in an immediate vicinity of the sensor, each blow-off device includes:
   a compressed air generator,
   an overpressure container,
   a blow-off nozzle position above the detection surface, and
   a switching valve, and
   the compressed air generator being connected to the overpressure container via a first line and the overpressure container being connected to the blow-off nozzle via a second line.

2. The facility according to claim 1, wherein the switching valve is electrically controlled.

3. The facility according to claim 1, wherein the compressed air generator is a piston pump.

4. The facility according to claim 1, wherein the compressed air generator is a compressor.

5. The facility according to claim 1, wherein the switching valve is a 3/2-way valve or a 3/3-way valve.

6. The facility according to claim 1, wherein the switching valve is time-controlled.

7. The facility according to claim 1, wherein the switching valve is pressure-controlled.

8. The facility according to claim 1, wherein the compressed air generator is operated permanently and the overpressure container is filled with ambient air.

9. The facility according to claim 1, wherein the switching valve is mechanical and selected in such a way that it opens at a certain pressure and closes again for pressure to build up again.

10. The facility according to claim 1, wherein the sensor transmits light or ultrasonic waves in a vertical direction via the detection surface.

11. The facility according to claim 1, wherein the compressed air generator is a piston pump or a compressor.

12. The facility according to claim 1, wherein:
the compressed air generator is connected to the overpressure container via a first line;
the compressed air container is connected to the blow-off valve via a second line;
the first and second lines are connected to the switching valve; and
the compressed air container is connected to the switching valve via a third line, and
depending on a switching position of the switching valve, the compressed air is pumped from the compressed air generator into the overpressure container or the compressed air is fed from the overpressure container and the first and second lines to the blow-off nozzle, via which the detection surface is blown on from above in order to free it from dust.

13. The facility according to claim 12, further comprising an air filter assigned to the compressed air generator via which the intake air is cleaned.

14. The facility according to claim 12, wherein the overpressure container features a pressure gauge which visualizes overpressure in the compressed air container and the blow-off nozzle is oriented in such a way that the detection surface of the sensor is completely swept by a blast of compressed air.

15. The facility according to claim 14, wherein the switching valve is electrically controlled and connected to a control unit, the control unit controls the switching valve via a first control line and the compressed air generator via a second control line, and the pressure gauge is also connected to the control unit via a signal line.

16. The facility according to claim 15, wherein when a preset pressure is reached in the overpressure container, a switching signal is given by the control unit to the switching valve to open so that compressed air from the compressed air container reaches the blow-off nozzle.

* * * * *